United States Patent
Tsai et al.

(10) Patent No.: US 11,197,263 B1
(45) Date of Patent: Dec. 7, 2021

(54) DECENTRALIZED DYNAMIC FREQUENCY SELECTION (DFS) MASTER SERVICE

(71) Applicant: Amazon Technologies, Inc., Seattle, WA (US)

(72) Inventors: Kun Ting Tsai, Fremont, CA (US); Kiran Kumar Edara, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 16/558,952

(22) Filed: Sep. 3, 2019

(51) Int. Cl.
*H04W 64/00* (2009.01)
*H04W 16/14* (2009.01)
*H04W 74/08* (2009.01)
*H04W 84/18* (2009.01)
*H04W 84/12* (2009.01)

(52) U.S. Cl.
CPC ......... *H04W 64/003* (2013.01); *H04W 16/14* (2013.01); *H04W 74/0808* (2013.01); *H04W 84/12* (2013.01); *H04W 84/18* (2013.01)

(58) Field of Classification Search
CPC . H04W 16/14; H04W 72/0453; H04W 84/12; H04W 84/18; H04W 16/10; H04W 74/0816; H04W 76/14; H04W 48/12; H04W 48/16; H04W 4/02; H04W 4/023; H04W 4/029; H04W 4/20; H04W 4/80; H04W 52/04; H04W 72/048; H04W 84/005; H04W 88/10; H04W 28/20; H04W 72/082; H04W 72/085; H04W 72/1242; H04W 88/08

See application file for complete search history.

(56) References Cited

U.S. PATENT DOCUMENTS

| | | | |
|---|---|---|---|
| 9,648,548 B1 * | 5/2017 | Gan | H04L 67/12 |
| 2016/0302195 A1 * | 10/2016 | Zhang | H04W 72/0446 |
| 2017/0041954 A1 * | 2/2017 | Tsai | H04W 16/14 |
| 2017/0085417 A1 * | 3/2017 | O'Reirdan | H04W 24/04 |
| 2017/0251068 A1 * | 8/2017 | Kappler | H04L 67/20 |
| 2017/0311360 A1 * | 10/2017 | Singh | H04L 61/6072 |

* cited by examiner

*Primary Examiner* — Omer S Mian
*Assistant Examiner* — Bao G Nguyen
(74) *Attorney, Agent, or Firm* — Lowenstein Sandler LLP

(57) ABSTRACT

Network hardware devices organized in a wireless mesh network (WMN). The mesh network device receives, from a first device that is not part of the WMN, a first request to receive information about radar events in an area. The first request includes an identifier of a Dynamic Frequency (DFS) channel and first proximity data for at least one mesh network device in the vicinity of the first device. The mesh network device determines that i) the first device is located within the area; and ii) the first device is communicatively coupled with the at least one mesh network device and sends authorization to receive information about the radar events and coverage map data that identifies the area. The mesh network device sends, to the first device, first data about a first radar event in response to the radar event.

20 Claims, 11 Drawing Sheets

DECENTRALIZED DYNAMIC FREQUENCY SELECTION (DFS) MASTER SERVICE

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
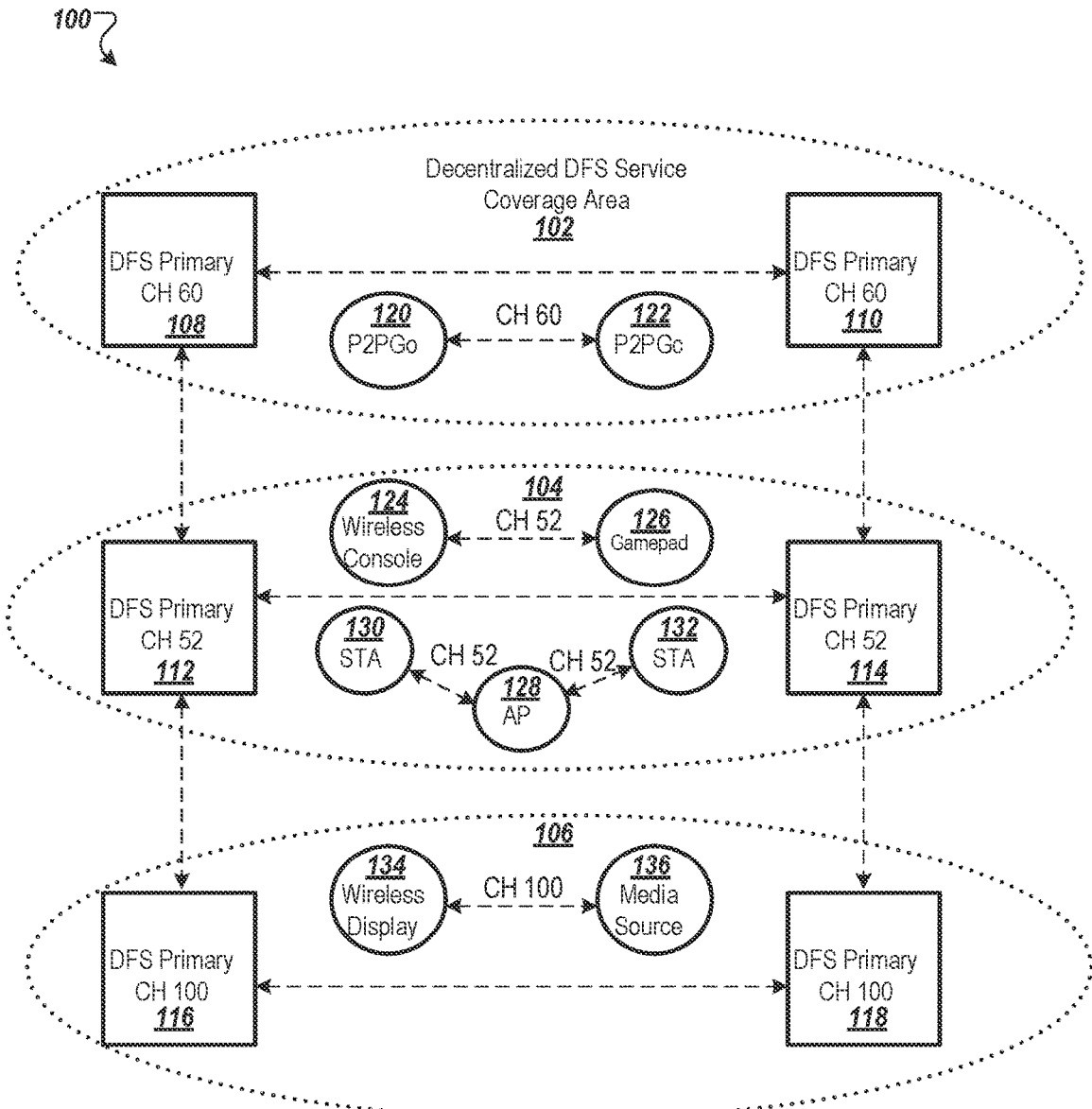
FIG. 1 is a network diagram of mesh network devices in a wireless mesh network (WMN) with three decentralized dynamic frequency selection (DFS) service coverage areas for providing radar event notifications to registered devices within the respective coverage areas according to one embodiment.

Technologies directed to decentralized DFS services are described. Network hardware devices organized in a wireless mesh network (WMN). Traditional DFS service operates in the constraint of a primary device providing radar detection solely for its direct secondary devices. In this model, the DFS service is limited to the primary's direct secondary devices where any secondary device that wants to use the DFS channel must be directly connected to the DFS primary device. The secondary device is directly connected to the DFS primary device when in a connected state after an exchange of keys and the secondary device and the primary device are both part of the same mesh network. That is the secondary device has to be connected to the same network as the primary device in order to receive DFS radar event notifications. In other words, any devices that are not part of the primary device's direct network cannot utilize the radar detection capability of the primary device and thus cannot use DFS channels even if there is a DFS primary device in physical proximity.

Aspects of the present disclosure address the above and other deficiencies by using a decentralized DFS service provided by a cluster of mesh network device. Decentralized DFS Master Service introduces DFS as a decentralized service where the DFS cluster of primary DFS devices provides DFS service to any device in the service coverage area even if the device is not part of the cluster's network. For example, the DFS cluster can provide DFS service to peer-to-peer devices such as wireless display, wireless remote control, game console, wireless gamepads, or the like. The decentralized DFS service can also provide service to other Access Points and wireless networks that are not part of the network. Any device that is in the coverage area of the Decentralized DFS Master Service can register for radar event notifications, then operate on the DFS channels without performing its own radar detection, channel availability check, or managing channel switches. An endpoint device can be considered to be within the service coverage area if they are located within two or more DFS primary nodes or if the endpoint device can receive frames from a minimum of two DFS. For example, the endpoint device can determine if the receive strength signal indicator (RSSI) values is lower than a threshold needed to be considered within range of a DFS primary node.

One mesh network device of the cluster can send coverage map data and an identifier of a DFS channel to an endpoint device that is not part of the wireless mesh network. The mesh network device receives, from the endpoint device, a registration request for radar events in a decentralized DFS service area. The mesh network device determines a requirement set for the endpoint device to use a DFS channel and sends the requirement set and a grant to the endpoint device. The mesh network device sends a radar event notification to the endpoint device in response to a radar event detected by any mesh network device in a cluster of mesh network device in the decentralized DFS service area.

In general, the mesh network devices in a WMN can cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. Alternatively, the embodiments can be used in other applications where the mesh network devices with radar detection capabilities can be leverage for providing radar event notifications to devices in physical proximity to the mesh network devices and without radar detection capabilities, even when the devices are not part of the same wireless mesh network as the mesh network devices. One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIG. 1 is a network diagram of mesh network devices in a wireless mesh network (WMN) 100 with three decentralized DFS service coverage areas 102, 104, 106 for providing radar event notifications to registered devices within the respective coverage areas according to one embodiment. The WMN 100 provides a decentralized DFS service using clusters of mesh network devices in the WMN 100. The cluster of mesh network devices can provide radar detection capability to any device in a service coverage area even if the device is not part of the cluster or part of the WMN 100. For example, as illustrated in FIG. 1, the WMN 100 includes six mesh network devices 108, 110, 112, 114, 116, and 118 that are interconnected. The mesh network device are considered DFS primary node as these mesh network devices include the radar detection capability. Each mesh network device can operate in at least one DFS channel, such as channel 60, channel 52, and channel 100 as illustrated in FIG. 1. The mesh network devices can cooperate to provide one or more decentralized DFS service coverage areas, such as coverage areas 102, 104, and 106. Since the mesh network device 108 and the mesh network device 110 both operate on the DFS channel 60, the two mesh network devices 108, 110 can form a first DFS cluster (also referred to herein as "cluster of mesh network devices" or just "cluster") to provide the decentralized DFS service coverage area 102 for providing radar event notifications to devices registered with the first DFS cluster. The first DFS cluster can provide DFS service to peer-to-peer devices 120, 122. The peer-to-peer devices 120, 122 are not necessarily connected to the mesh network devices 108, 110 in the WMN 100. For example, the peer-to-peer device 120 can be a wireless display, a wireless speaker, or the like, and the peer-to-peer device 122 can be a game console, a wireless game pad, or the like. In some cases, the peer-to-peer devices 120, 122 do not have radar detection capability, but registering with the first DFS cluster, the registered devices in the decentralized DFS service coverage area 102 can operate on the DFS channels without performing their own radar detection, channel availability check, or managing channel switches.

Since the mesh network device 112 and the mesh network device 114 both operate on the DFS channel 52, the two mesh network devices 112, 114 can form a second DFS cluster to provide the decentralized DFS service coverage area 104 for providing radar event notifications to devices registered with the second DFS cluster. The second DFS cluster can provide DFS service to peer-to-peer devices 124 (e.g., wireless console), 126 (e.g., gamepad), as well as other Access Points (AP) and wireless networks that are not part of the DFS cluster's network, i.e., WMN 100. For example, an access point (AP) 128 can communicate with a first station 130 and a second station 132 on a wireless network that is separate from the WMN 100. The AP 128 can operate on DFS channel 52 and can register with the second DFS cluster in the decentralized DFS service coverage area 104 and receive radar event notifications. In some cases, the AP 128, first station 130, and second station 132 do not have radar detection capability, but registering with the second DFS cluster, the registered devices in the decentralized DFS service coverage area 104 can operate on the DFS channels without performing their own radar detection, channel availability check, or managing channel switches.

Since the mesh network device 116 and the mesh network device 118 both operate on the DFS channel 100, the two mesh network devices 116, 118 can form a third DFS cluster to provide the decentralized DFS service coverage area 106 for providing radar event notifications to devices registered with the third DFS cluster. The third DFS cluster can provide DFS service to peer-to-peer devices 134 (e.g., wireless display), 136 (e.g., media source). The peer-to-peer devices 134, 136 can operate on DFS channel 100 and can register with the third DFS cluster in the decentralized DFS service coverage area 106 and receive radar event notifications. In some cases, the peer-to-peer devices 134, 136 do not have radar detection capability, but registering with the third DFS cluster, the registered devices in the decentralized DFS service coverage area 106 can operate on the DFS channels without performing their own radar detection, channel availability check, or managing channel switches.

The decentralized DFS service introduces DFS as a decentralized service where a DFS cluster provides the DFS service to any device in the service coverage area even if the device is not part of the cluster's network. As such, the DFS service can be provided as an out-of-band signaling to devices that are not in the same network as the mesh network devices when the devices are registered to receive the out-of-band signaling from the DFS service. The DFS service can also provide service to other APs and wireless networks that are not part of the DFS cluster's network. Any device that is in the coverage area of the decentralized DFS service can register for radar event notifications, then operate on the DFS channels without performing its own radar detection, channel availability check, or managing channel switches. The decentralized DFS service can be provided by two or more DFS primary nodes (mesh network devices with the radar detection capability and operating on a same DFS channel). That is a device can registered to a DFS cluster of two or more DFS primary nodes when the device can hear a minimum of two DFS primary nodes.

In one embodiment, the WMN 100 is a DFS mesh network with a first mesh network device (e.g., 108) with radar detection capability and a second mesh network device (e.g., 110) with radar detection capability. The first mesh network device (e.g., 108) can perform a first scan using a radio of the first mesh network device. The first scan finds a set of neighbor devices in physical proximity to the first mesh network device, the second of neighbor devices including the second mesh network device (e.g., 110). The first mesh network device sends a first frame to the second mesh network device. The frame includes a first proximity report with first proximity data for a first list of devices found as a result of the first scan and an identifier of a DFS channel used by the radio of the first mesh network device. In another embodiment, the first proximity report includes a first list of devices found as a result of the first scan, a first proximity value for each device in the first list, the first proximity value representing a distance between the first mesh network device and the respective device in the first list. The first mesh network device receives a second frame from the second mesh network device, including a second proximity report with second proximity data for a second list of devices found as a result of a second scan by the second mesh network device and the identifier of the DFS channel used by a radio of the second mesh network device. In another embodiment, the second proximity report includes a second list of devices found as a result of a second scan by the second mesh network device, a second proximity value for each device in the second list, the second proximity value representing a distance between the second mesh network device and the respective device in the second list, the DFS channel used by a radio of the second mesh network device. The first mesh network device updates first coverage map data that represents a DFS service coverage area (e.g., 102). The DFS service coverage area includes a cluster of mesh network devices with the radar detection capability for providing radar event notifications to a registered device located in the DFS service coverage area 102. The cluster of mesh network device can provide radar event notifications to the registered device even when the registered device is not part of the DFS mesh network. The mesh network device receives a first request, from an endpoint device located with the DFS service coverage area, to register the endpoint device for the radar event notifications while located in the DFS service coverage area. The first request includes third proximity data for a third list of devices found as a result of a third scan by the endpoint device. The endpoint device is not part of the DFS mesh network and does not have an established link with the first mesh network device or the second mesh network device. The first mesh network device determines a location of the endpoint device from the fourth list; or determines that the endpoint device is located within the DFS service coverage area from the third proximity data. The first mesh network device determines a signal strength requirement for the endpoint device to use the DFS channel. The signal strength requirement can specify a range of signal strengths that the endpoint device must operate within for operating on the DFS channel. The signal strength requirement can also specify a list of addresses of devices in the cluster. The first mesh network device sends a first response to the endpoint device, including a grant of the first request to register the endpoint device and the signal strength requirement. Alternatively, other requirement sets can be defined. The first mesh network device sends a radar event notification to the endpoint device in response to a radar event detected in the DFS service coverage area by any one device of the cluster of mesh network devices. The endpoint device can receive the radar event notification without performing its own radar detection or channel availability check (CAC). In general, any device that is in the coverage area of the Decentralized DFS Master Service can register for radar event notifications, then operate on the DFS channels without performing its own radar detection, channel availability check, or managing channel switches.

In a further embodiment, the first mesh network device determines a change to the first coverage map data resulting in second coverage map data that is smaller in area than the first coverage map data. As a result, the first mesh network device deregisters the endpoint device and sends a third frame to the endpoint device. The frame includes a channel switch announcement (e.g., channel switch announcements (CSA) action frame) that switches a radio of the endpoint device from the DFS channel to a non-DFS channel and prohibits use of the DFS channel by the radio of the endpoint device until the endpoint device re-registers with the cluster of mesh network devices. In another embodiment, the first mesh network device sends a third frame, such as a keep-alive frame, to the endpoint device after a period of time. The second mesh network device can send a fourth frame, such as a keep-alive frame, to the endpoint device after the period of time.

In another embodiment, the first mesh network device receives a second request from the endpoint device to request use of a decentralized DFS service provided by the cluster of mesh network devices. The second request is received prior to the first request. The first mesh network device sends a second response to the endpoint device. The second response includes the first coverage map data and the identifier of the DFS channel used by the radio of the first mesh network device. The endpoint device continues to communicate on the DFS channel after receiving the grant and until: i) the endpoint device fails to receive a keep-alive frame each of the mesh network devices in the cluster; or ii) the endpoint device receives a channel switch announcement from any of the mesh network devices in the cluster.

In another embodiment, the endpoint device sends a second request to the first mesh network device to request use of a decentralized DFS service provided by the cluster. The endpoint device receives a second response from the first mesh network device. The response includes the first coverage map data and the DFS channel used by the radio of the first mesh network device. The endpoint device sends the first request to register after receiving the second response and communicates on the DFS channel after receiving the grant in the first response from the first mesh network device. The endpoint device continues to communicate on the DFS channel until: i) failing to receive a keep-alive frame each of the mesh network devices in the cluster; or ii) receiving a channel switch announcement from any of the mesh network device in the cluster.

Figure 2:
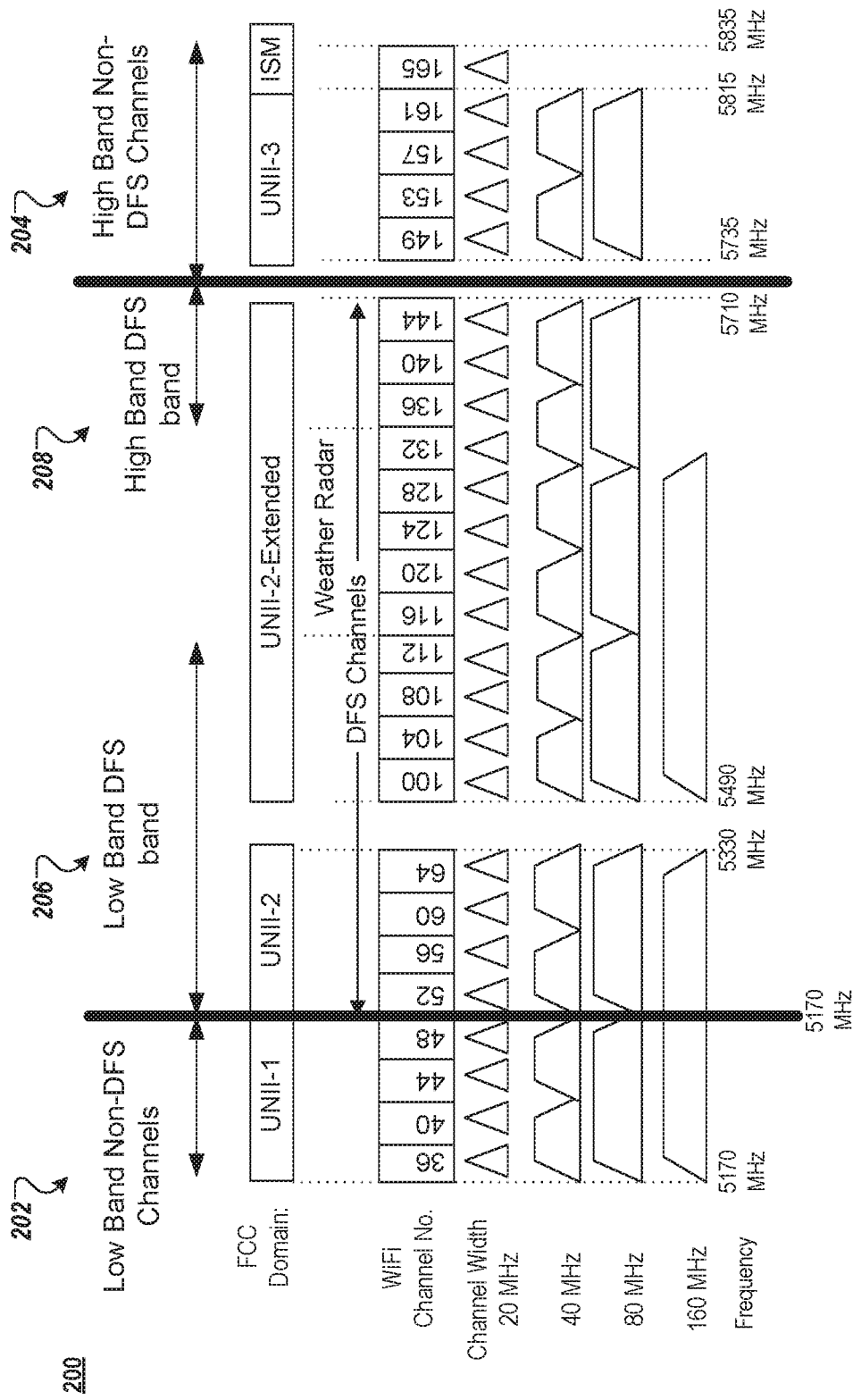
FIG. 2 is a graph that illustrates channel allocation by radios under a wireless local area network (WLAN) protocol including DFS channels and non-DFS channels according to an embodiment.

FIG. 2 is a graph 200 that illustrates channel allocation by radios under a wireless local area network (WLAN) protocol including DFS channels (in bands 206, 208) and non-DFS channels 202, 204 according to an embodiment. Across the top of the graph 200 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels spans 80 MHz, and any series of eight channels spans 160 MHz.

Although a radio may operate on one primary channel (e.g., channel (CH) 100), a radio can operate on a wider channel bandwidth such as over a 40, 80, or 160 MHz. Radar detection, however, may occur most frequently on the primary 20 MHz channel. For example, consider bandwidth 80 MHz with primary channel 52 and secondary channels 56, 60, and 64 (each 20 MHz wide). An interference event present on the secondary channels 56, 60, and 64 may not be reported unless the communication link bandwidth is reduced to 20 MHz for detection purposes. A communication link in this case may be defined to operate on a channel and bandwidth that has one or more 20 MHz channels as a "DFS radar channel" or "DFS channel."

Recognizing the fact that a DFS radar channel may be considered to include multiple secondary channels, two channel bandwidths may be defined for the communication link, namely an operating channel bandwidth and a communication link bandwidth. In various embodiments, the operating channel bandwidth is fixed at a maximum channel bandwidth allowed by the WLAN protocol for receiving data within the first primary channel and multiple secondary channels between two devices (e.g., two mesh network device devices or between a client wireless device and a mesh network device). According to complementary embodiments, the communication link bandwidth is set to a first frequency range and is adjustable by the radio to be identical to or lower than the operating channel bandwidth.

In one embodiment, the operating channel bandwidth of the communication link is channel 80 MHz with primary channel 52, whereas the communication link bandwidth could be 20 MHz. In this case, the radios in the communication link perform 20 MHz frame exchange; however, the radios can still receive on the entire 80 MHz frequency band. The communication link bandwidth, however, could be expanded to include additional 20 MHz bands within the 80 MHz frequency band.

In the event of a radar event, the CSA action frames can direct a device to switch from a DFS channel to a non-DFS channel as described herein. In some cases, the non-DFS channel is selected from a same frequency band group as the DFS channel. In particular, a non-DFS channel can be selected from a low band group of non-DFS channels 202 corresponding to a low band DFS band 206. The channels in the low band group of non-DFS channels 202 can have similar signal propagation characteristics, attenuation factors, and output power as the channels in the low band DFS band 206. Another DFS channel can be selected from a high band group of non-DFS channels 204 corresponding to a high band DFS band 208. The channels in the high band group of non-DFS channels 204 can have similar signal propagation characteristics, attenuation factors, and output power as the channels in the high band DFS band 208. For each band group, the non-DFS channel can be selected by a remote server in order to minimize interference and avoid congestion and minimize interference.

When a DFS primary node first powers on, it performs a proximity scan to discover the neighbor primary nodes, announces itself to the neighbors, then updates the service coverage map data with the new coverage map data. The coverage map data is determined by the proximity report exchange. The proximity report includes the node's scan list (RSSI) of its neighbors, the node's proximity to its neighbors (from round trip time), angle of arrival of neighbor's packets, the node's serving DFS channel, and its service coverage map data, such as described below with respect to FIG. 3. The angle of arrival is a value that represents an angle from which a device receives packets from a neighboring device. Calculating the angle of arrival is a technique for finding the direction that an incoming packet is coming from and calculating the angle of arrival can be the basis for triangulation of a device. For example, the a device can determine an angle of arrival from incoming packets from each neighboring device from which it receives packets and sends the angle of arrival for each device from which it receives packets.

Figure 3:
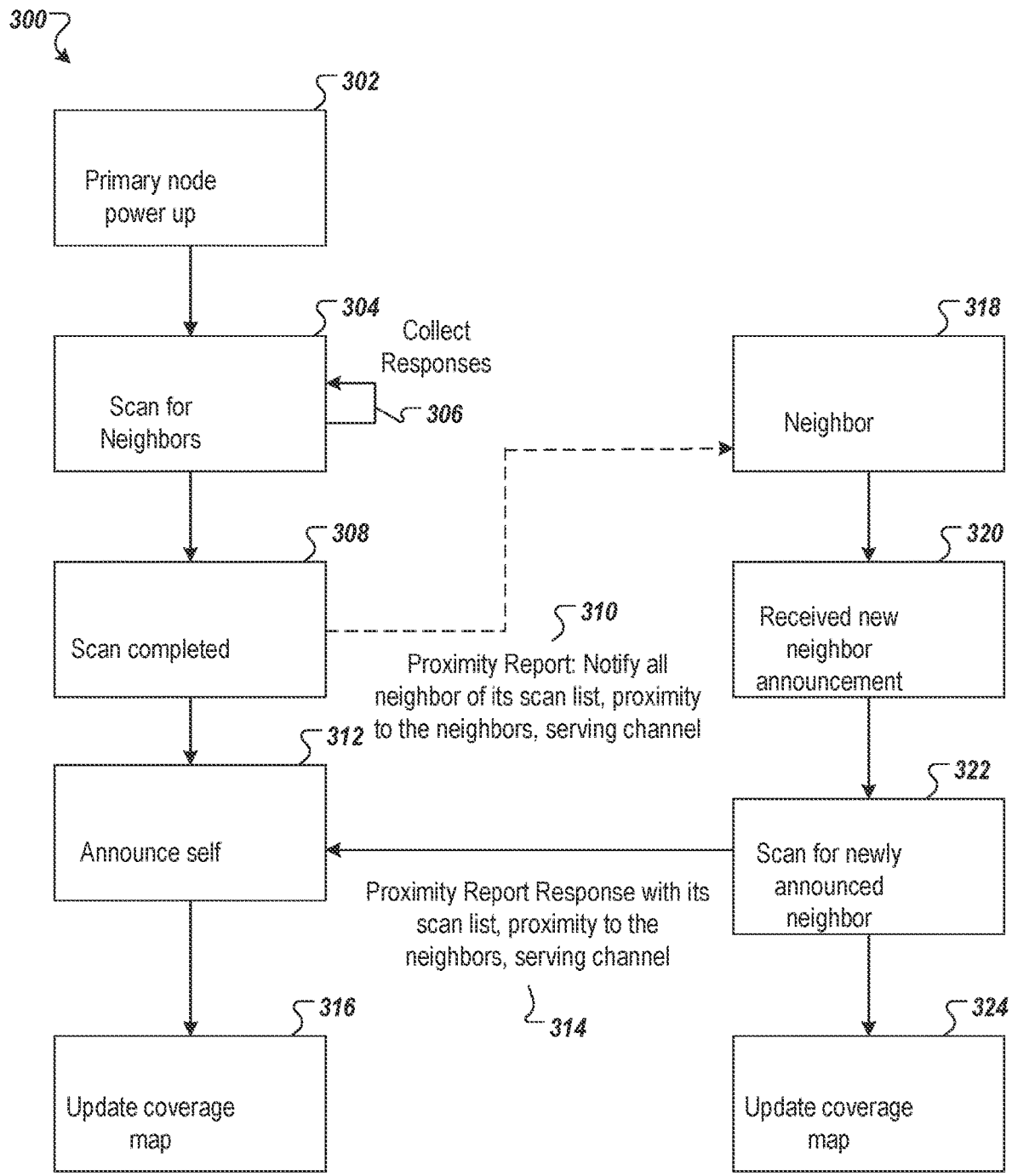
FIG. 3 is a flow diagram of a method of updating coverage map data corresponding to a decentralized DFS service coverage area according to one embodiment.

FIG. 3 is a flow diagram of a method 300 of updating coverage map data corresponding to a decentralized DFS service coverage area according to one embodiment. A first mesh network device (also referred to as a first DFS primary node) powers up (block 302) and performs a first scan using a radio of the first mesh network device (block 304). The first scan finds a set of neighbor devices in physical proximity to the first mesh network device, including a second mesh network device (also referred to as a second DFS primary node). As part of the first scan, the first mesh network device collects responses from the set of neighbor devices (block 306). Once the first scan is completed at block 308, the first mesh network device can send a first proximity report 310 to the second mesh network device. The first mesh network device can notify all neighbors of its scan list, proximity to the neighbors, and DFS service channel used by the first mesh network device by sending the first proximity report. For example, the first proximity report 310 can include: i) a first list of the set of neighbor devices found as a result of the first scan and for each neighbor device in the first list; ii) a first proximity value that represents a distance between the first mesh network device and the respective device; and iii) an identifier of a DFS channel used by a radio of the respective device. The first proximity report can also include: vii) a signal strength value between the first mesh network device and each neighbor device in the first list; and viii) a angle of arrival of one or more packets received from each neighbor device in the first list. In another embodiment, the first mesh network device can send the ix) coverage map data generated by the first mesh network device.

The first mesh network device can announce itself (block 312) and receives a second proximity report 314 from a second mesh network device. That is, in response to announcing itself, the first mesh network device receives proximity report responses from the other devices in the set of mesh network devices found in the first scan. The second proximity report 314 can include: iv) a second list of devices found as a result of a second scan by the second mesh network device and for each device in the second list; v) a second proximity value that represents a distance between the second mesh network device and the respective device; and vi) an identifier of a DFS channel used by a radio of the respective device. In another embodiment, the second proximity report can also include: vii) a signal strength value between the second mesh network device and each device in the second list; and viii) a angle of arrival of one or more packets received from each device in the second list. In another embodiment, the first mesh network device can send the ix) coverage map data generated by the second mesh network device.

The first mesh network device can update coverage map data using the first proximity report 310 and the second proximity report 314, as well as any other proximity reports received from other mesh network devices. That is, the first mesh network device determines the coverage map data using at least the first proximity report 310 and the second proximity report 314.

The second mesh network device (a neighbor device) can receive the first proximity report 310 from the first mesh network device (block 318). The second mesh network device receives the new neighbor announcement sent by the first mesh network device at block 312 (block 320) and can scan for newly announced neighbors (block 322). In response to the announcement by the first mesh network device, the second mesh network device sends the second proximity report 314 to the first mesh network device (block 322) and update the coverage map data (block 324). The second mesh network device can determine the coverage map data using the first proximity report 310 and the second proximity report 314, as well as any other proximity reports received from other mesh network devices. That is, the second mesh network device determines the coverage map data using at least the first proximity report 310 and the second proximity report 314.

In a further embodiment, the first mesh network device (primary node), which is part of a mesh network, sends coverage map data and an identifier of a DFS channel to an endpoint device that is not part of the mesh network. The coverage map data identifies a decentralized DFS service coverage area for providing radar event notifications by a cluster of mesh network devices that is part of the mesh network. The first mesh network device can receive, from the endpoint device, a first request to register with the cluster for radar events in the decentralized DFS service coverage area. The first request can be to receive information about radar events in an area in which data associated with the radar event is sent by one of the mesh network devices. The first request includes first proximity data for a list of devices found as a result of a scan by the endpoint device. The first request can include proximity data for at least one mesh network device in the vicinity of the first device. The first mesh network device determines a requirement set for the endpoint device to use a DFS channel. The requirement set can indicate that: i) the endpoint device must be located within the coverage map data; and ii) the endpoint device must maintain a minimum signal strength level with at least one mesh network device of the cluster. In another embodiment, the first mesh network device can determine that i) the endpoint device is located within the area and ii) the endpoint device is communicatively coupled with at least one of the mesh network devices. Alternatively, the requirement set can indicate other conditions for the endpoint device to use the DFS channel. The first mesh network device sends a first response to the endpoint device. The first response includes the requirement set and a grant of the first request to register the endpoint device. In another embodiment, the first mesh network device sends to the endpoint device authorization to receive information about the radar events. The first mesh network device sends a radar event notification to the endpoint device in response to a radar event detected by any mesh network device in the cluster. That is, the first mesh network device can send data about the radar event in response to the radar event being detected by a mesh network device that is part of the one or more mesh network devices. In a further, the first mesh network device receives, prior to sending the coverage map data, a second request from the endpoint device to request use of a decentralized DFS service provided by the cluster.

In a further embodiment, the first mesh network device provides a decentralized DFS service to the endpoint device.

The endpoint device can be a peer-to-peer device, a wireless display, a wireless remote control, a game console, a wireless game pad, or the like. The first mesh network device can provide the decentralized DFS service to another type of endpoint device, such as an access point (AP) or a network device of a wireless network that is not part of the mesh network. It should be noted that the AP is not necessarily an endpoint device in the wireless network, but can be considered an endpoint device with respect to the decentralized DFS service.

In another embodiment, the first mesh network device performs a proximity report exchange with each mesh network device in the mesh network. That is, the first mesh network device can exchange proximity reports with other neighbor mesh network devices in the wireless network. In another embodiment, the first mesh network device exchanges proximity reports only with mesh network devices that it can directly communicate. The first mesh network device determines the coverage map data from results of the proximity report exchange. In one embodiment, the first mesh network device performs the proximity report exchange by sending a first proximity report to a second mesh network device in the mesh network and receiving a second proximity report from the second mesh network device. The first proximity report can include a first scan list of signal strength indicators corresponding to each neighbor device found by the first mesh network device, a round trip time corresponding to each neighbor device found by the first mesh network device, an angle of arrival for each neighbor device found by the first mesh network device, a DFS channel used by the first mesh network device, and optionally a first local service coverage map data. The first local service coverage may correspond to a signal range of the radio of the first mesh network device. That is, the first local service coverage map identifies a first area within a signal range of the first mesh network device. The second proximity report can include a second scan list of signal strength indicators corresponding to each neighbor device found by the second mesh network device, a round trip time corresponding to each neighbor device found by the second mesh network device, an angle of arrival for each neighbor device found by the second mesh network device, a DFS channel used by the second mesh network device, and optionally a second local service coverage map data. The second local service coverage may correspond to a signal range of the radio of the second mesh network device. That is, the second local service coverage map identifies a second area within a signal range of the second mesh network device. The first proximity report could also include a first number of signal strength indicators each corresponding to a device detected by the first mesh network device and the second proximity report could also include a second number of signal strength indicators each corresponding to a device detected by the second mesh network device.

In another embodiment, the first mesh network device determines the coverage map data by adding, a second local service coverage map data, received from a second mesh network device as part of the proximity report exchange, to a first local service coverage map data of the first mesh network device. That is, the coverage map data identifies an area within the signal ranges of the first and second mesh network devices. In another embodiment, the first mesh network device expands a first local service area map data with a second local service area map data received from the second mesh network device. Details on expanding the coverage map data, corresponding to the decentralized DFS service coverage area, are described below with respect to FIG. 4.

Figure 4:
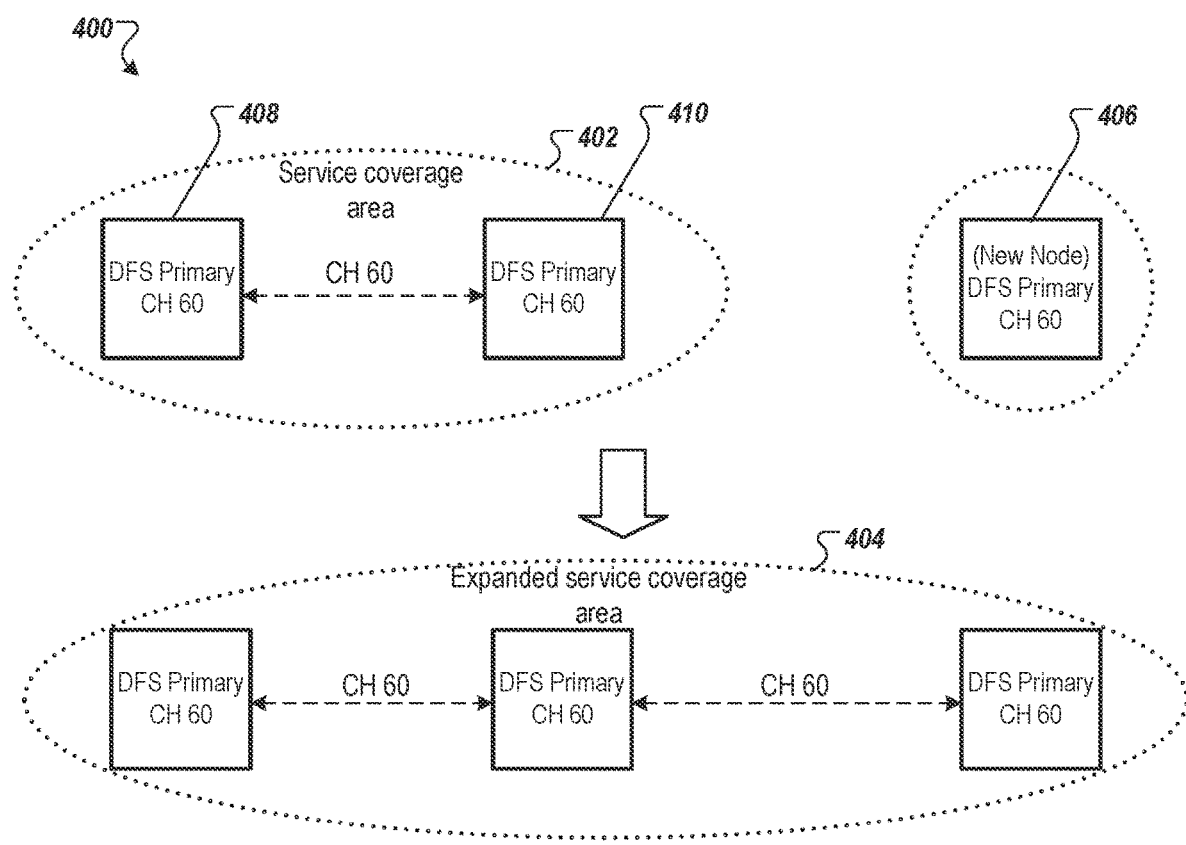
FIG. 4 is a network diagram of a DFS mesh network in which a mesh network device is added to a service coverage area to expand into an expanded service coverage area according to one embodiment.

FIG. 4 is a network diagram of a DFS mesh network 400 in which a mesh network device 406 is added to a service coverage area 402 to expand into an expanded service coverage area 404 according to one embodiment. The DFS mesh network 400 includes a first mesh network device 408 and a second mesh network device 410. The first mesh network device 408 and second mesh network device 410 are considered DFS primar node as they include the radar detection capability. The first mesh network device 408 and second mesh network device 410 can operate in at least one DFS channel, such as channel 60. The first mesh network device 408 and second mesh network device 410 can cooperate to provide a service coverage area 402 for the decentralized DFS service. Since the first mesh network device 408 and second mesh network device 410 both operate on the DFS channel 60, they form a DFS cluster to provide the decentralized DFS service to the service coverage area 402 for providing radar event notifications to devices registered with the DFS cluster, even to devices that are not part of the DFS mesh network 400. In some cases, the registered devices do not have radar detection capability, but register with the DFS cluster in order to operate on the DFS channels without performing their own radar detection, channel availability check, or managing channel switches.

As a new DFS primary node, a third mesh network device 406, joins the DFS mesh network 400 (or simply just joins the DFS cluster, the coverage map data, corresponding to the service coverage area 402, can be expanded. That is, the third mesh network device 406 can provide data to the DFS cluster and each of the devices in the cluster update the coverage map data to correspond to the expanded service coverage area 404. The third mesh network device 406 can operate on the same DFS channel 60. Since the third mesh network device 406 operate on the same DFS channel 60, the third mesh network device 406 can join the DFS cluster to provide the decentralized DFS service to the service coverage area 402 for providing radar event notifications to devices registered with the DFS cluster, even to devices that are not part of the DFS mesh network 400. The third mesh network device 406 can cooperate with the first mesh network device 408 and second mesh network device 410 to provide the expanded service coverage area 404 for the decentralized DFS service.

The service coverage area can change dynamically, expanding and contracting under certain conditions, such as when keep-alive frames are not received from one of the mesh network device within a specified time period. For example, a keep-alive frame can be sent by a device to check that the link between the two device is still operating and to prevent the link from being broken. The keep-alive frames are sent at predefined intervals so that if no keep-alive frame is received, it is assumed that the link is down, there is a problem with the other device, or the like. The specified time period can be predefined internal established for the mesh network and if a keep-alive frame is not by one of the mesh network device in the DFS cluster, the one mesh network device can be removed from the DFS cluster. As described herein, the DFS cluster can detect a radar event and can provide radar event notifications to registered devices, such as illustrated in FIG. 5.

Figure 5:
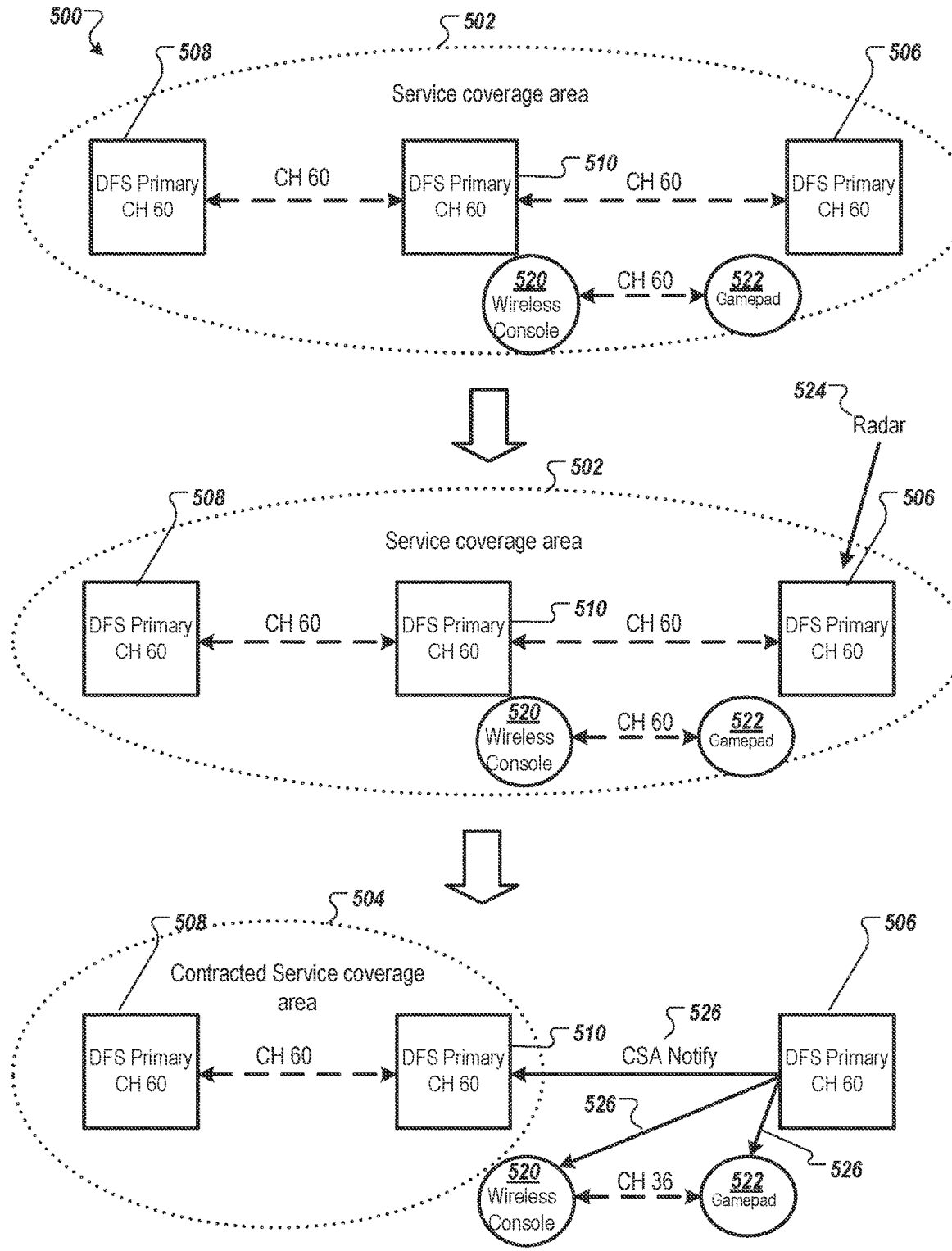
FIG. 5 is a network diagram illustrating a service coverage area before a radar event, during a radar event, and after a radar event according to one embodiment.

FIG. 5 is a network diagram illustrating a service coverage area 502 before a radar event 524, during a radar event 524, and after a radar event 524 according to one embodiment. A DFS cluster 500 includes three DFS primary nodes, mesh network devices 506, 508, 510, operating on DFS channel 60 and providing a decentralized DFS service to a service coverage area 502. A wireless console 520 and a gamepad 522 also operate on DFS channel 60 and registered with the DFS cluster 500.

During operation, each DFS primary node listens for its neighbor primary nodes' beacons and Channel Switch Announcement (CSA) action frames to determine the health of its neighbor primary nodes. In the case of receiving CSA action frame from the neighbor or if the neighbor's beacons are no longer detected within 200 ms (channel closing time of 260 ms), the DFS primary node removes the neighbor from the coverage map data, updates the coverage map data, and propagates the coverage map data update to all its neighbors and all registered devices using action frames. For example, as illustrated in FIG. 5, the third mesh network device 506 detects the radar event 524 and sends a CSA action frame 526 to the neighbor DFS primary node, second mesh network device 510, as well as to all registered devices. If the primary node is the node that detected radar, it will send CSA action frame to all its neighbors, all registered devices, and disables its beacon on the channel where radar was detected. Since wireless console 520 and gamepad 522 are registered with the DFS cluster 500, the third mesh network device 506 sends the CSA action frame to the wireless console 520 and gamepad 522, even if they are not part of the DFS mesh network. That is, the wireless console 520 and gamepad 522 do not need to be DFS secondary devices to the DFS primary node to be notified of the radar event 524. The CSA action frame 526 can includes the third mesh network device's MAC address, DFS serving channel, and the non-DFS channel (e.g., channel 36) that the third mesh network device 506 switches to in the event of the radar event 524 being detected. Upon receiving the CSA action frame 526 (or other type of radar event notification) from the third mesh network device 506, the wireless console 520 and gamepad 522 switch to the designated non-DFS channel (e.g., channel 36). Upon receiving the CSA action frame 526 (or other type of radar event notification) from the third mesh network device 506, the first mesh network device 508 and second mesh network device 510 update the coverage map data corresponding to a contracted service coverage area 504 as the third mesh network device 506 is no longer part of the DFS cluster 500 because of the third mesh network device 506 detecting the radar event 524. Similarly, if any one of the DFS primary nodes determines that a registered device will no longer be covered by the service coverage area (e.g., 502, 504), a CSA action frame can be sent to the registered devices. It is said that the registered device is covered by the service coverage area when the registered device is within the signal ranges of the DFS primary nodes that form the DFS cluster 500 and meet the requirements of the authorization. So, when the registered device is no longer covered by the service coverage area, the registered device is either not within the area in which radar event notifications can be received from the DFS primary nodes or the registered device is no longer authorized to receive the radar event notifications as described herein.

In one embodiment, each of the mesh network devices in the DFS cluster 500 listen for beacons or action frames sent by the other mesh network devices in the DFS cluster 500. For example, the second mesh network device 510 listens for a beacon or action frame sent by the third mesh network device 506. The second mesh network device 510 determines that a first action frame (e.g., CSA action frame 526) to switch channels is received from the third mesh network device 506. Alternatively, the second mesh network device 510 can determine a status of the third mesh network device 506 using a beacon or action frame received from the third mesh network device 506. The second mesh network device 510 can remove a local service coverage map data, corresponding to the third mesh network device, from the coverage map data to obtain an updated coverage map data, such as corresponding to the contracted service coverage area 504. The second mesh network device 510 can send the updated coverage map data to the first mesh network device 508, and in some cases to registered endpoint devices. The second mesh network device 510 determines that a registered endpoint device is no longer covered by the updated coverage map data and can send to the endpoint device a second action frame to switch channels.

In the embodiment depicted in FIG. 5, the second mesh network device 510 can detect the radar event 524 and send a radar event notification to each mesh network device in the DFS cluster 500 and the registered endpoint devices, including the wireless console 520 and the gamepad 522. The third mesh network device 506 can disable beacon frames from being sent on the DFS channel. This can remove the third mesh network device 506 from the contracted service coverage area.

In another embodiment, the second mesh network device 510 can determine that a beacon frame is not received from the third mesh network device 506 within a specified time period (instead of detecting the radar event 524). The second mesh network device 510 can remove a local service coverage map data, corresponding to the third mesh network device 506, from the coverage map data to obtain an updated coverage map data, corresponding to the contracted service coverage area 504. The second mesh network device 510 can send the updated coverage map data to the first mesh network device 508. The second mesh network device 510 can also send the updated coverage map data, or an action frame, to registered endpoint devices. For example, if the third mesh network device 506 is removed from the DFS cluster 500 and the wireless console 520 and gamepad 522 are registered with the DFS cluster 500, the second mesh network device 510 can determines that these registered endpoint devices will no longer be covered by the updated coverage map data because they are outside of the contracted service coverage area 504. The second mesh network device 510 can send a second action frame to the endpoint devices to switch from the DFS channel 60.

Figure 6:
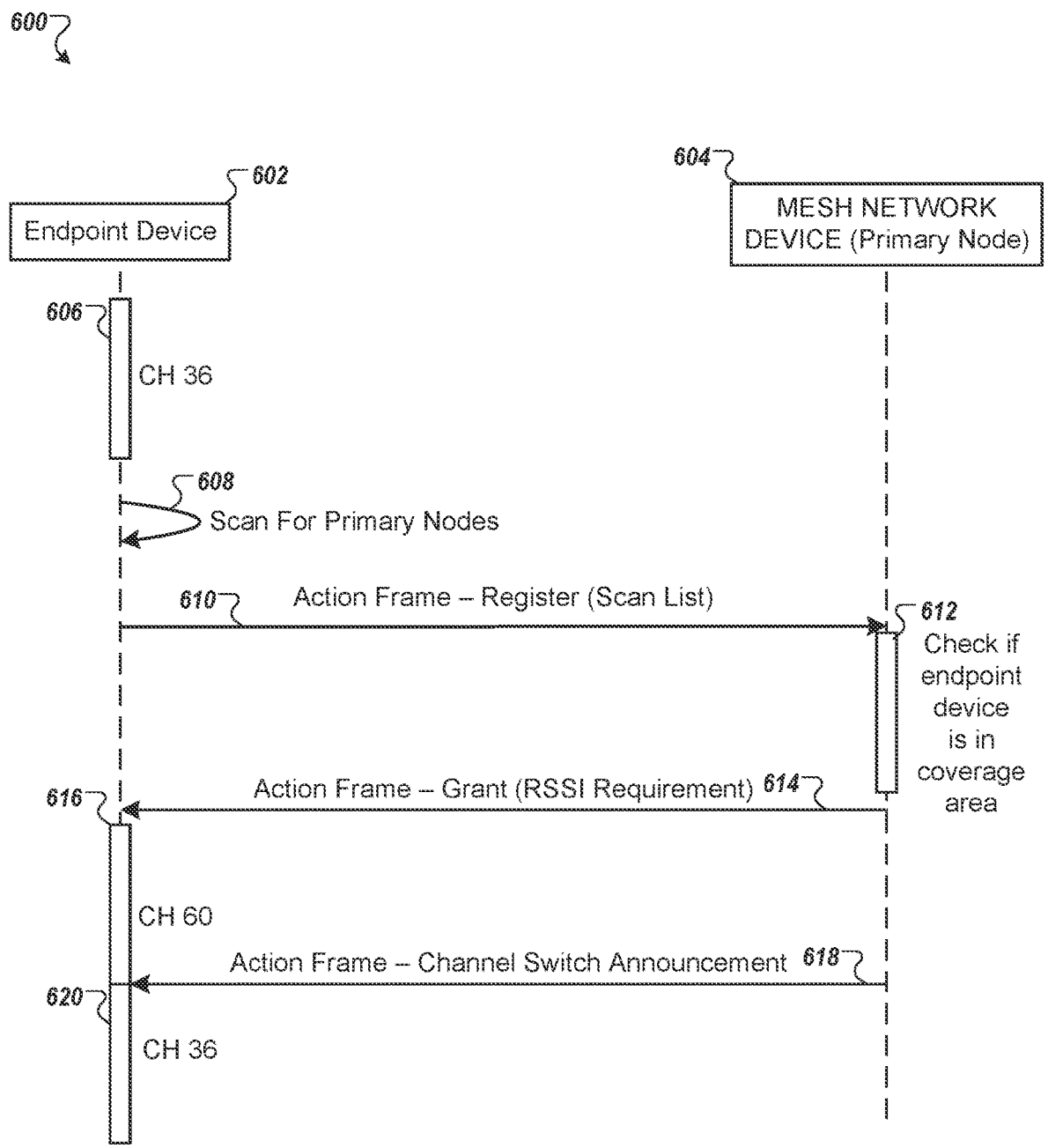
FIG. 6 is a sequence diagram of a method of operations of an endpoint device and a mesh network device in a decentralized DFS service coverage area according to one embodiment.

FIG. 6 is a sequence diagram of a method 600 of operations of an endpoint device 602 and a mesh network device 604 in a decentralized DFS service coverage area according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the endpoint devices and mesh network devices described herein and illustrated with respect to FIGS. 1-5.

Referring back to FIG. 6, an endpoint device 602 can operate on a non-DFS channel (operation 606). When an endpoint device is interested in using a decentralized DFS service, the endpoint device 602 can perform a scan for DFS primary nodes (operation 608). The endpoint device 602 can send a discovery probe in the form of a probe request. Any DFS primary node receiving the probe request will respond with a probe response including the DFS coverage map data and a DFS serving channel in the probe response, such as in an information element of a response frame. The coverage map data can include a list of primary nodes in the coverage area and their corresponding MAC addresses. Upon receiving the probe response, the endpoint device 602 registers with a DFS primary node, mesh network device 604 in this depicted embodiment, by sending a scan list in the form of an action frame 610 to the DFS primary node. The mesh network device 604 can be the DFS primary node with the strongest signal detected in the scan at operation 608. The mesh network device 604 uses the scan list from the endpoint device 602 to determine a location of the endpoint device 602 and derives a RSSI requirement list (also referred to herein as a requirement set of conditions for the endpoint device to use the DFS channel). For example, the RSSI requirement list is a list of primary node MAC addresses and a RSSI range that the device must operate within. The mesh network device 604 responds to the endpoint device 602 with an action frame 614, including the RSSI requirement list and a grant or denial, granting or denying the registration by the endpoint device 602. In response to the action frame 610, the mesh network device 604 can check if the endpoint device 602 is in the coverage area (operation 612). The mesh network device 604 can deny the registration if the endpoint device 602 is not within the coverage area. In response to the action frame 614, the endpoint device 602 can now start operating on the DFS channel (operation 616). The endpoint device 602 can continue to operate on DFS channel as long as 1) the endpoint device 602 does not receive a CSA action frame from any of the DFS primary nodes specified in the RSSI requirement list and 2) the endpoint device 602 is still receiving beacons in a specified period (e.g., the last 200 ms) from all the DFS primary nodes, specified in the requirement list, and a current RSSI is within the RSSI requirement. As illustrated in FIG. 6, the endpoint device 602 receives an action frame 618 received from the mesh network device 604. The action frame can include a CSA to switch channels from the DFS channel to a non-DFS channel. In response to the action frame 618, the endpoint device 602 can switch from the DFS channel (e.g., channel 60) to a non-DFS channel (e.g., 36) and can operate on the non-DFS channel (operation 620).

In some cases, the endpoint device 602 can periodically send keep-alive action frames to any primary node in the RSSI requirement list to announce its presence. In other embodiments, a DFS primary node may deregister the endpoint device 602 due to a change in coverage area by sending a CSA frame (e.g., action frame 618) to the endpoint device 602. Upon receiving a CSA frame (e.g., action frame 618) from a DFS primary device (e.g., mesh network device 604), the endpoint device 602 must re-register with a DFS primary node in the DFS service cluster in order to use a DFS channel again. That is, the endpoint device 602 can repeat operations 610 to re-register with a DFS primary node.

Figure 7:
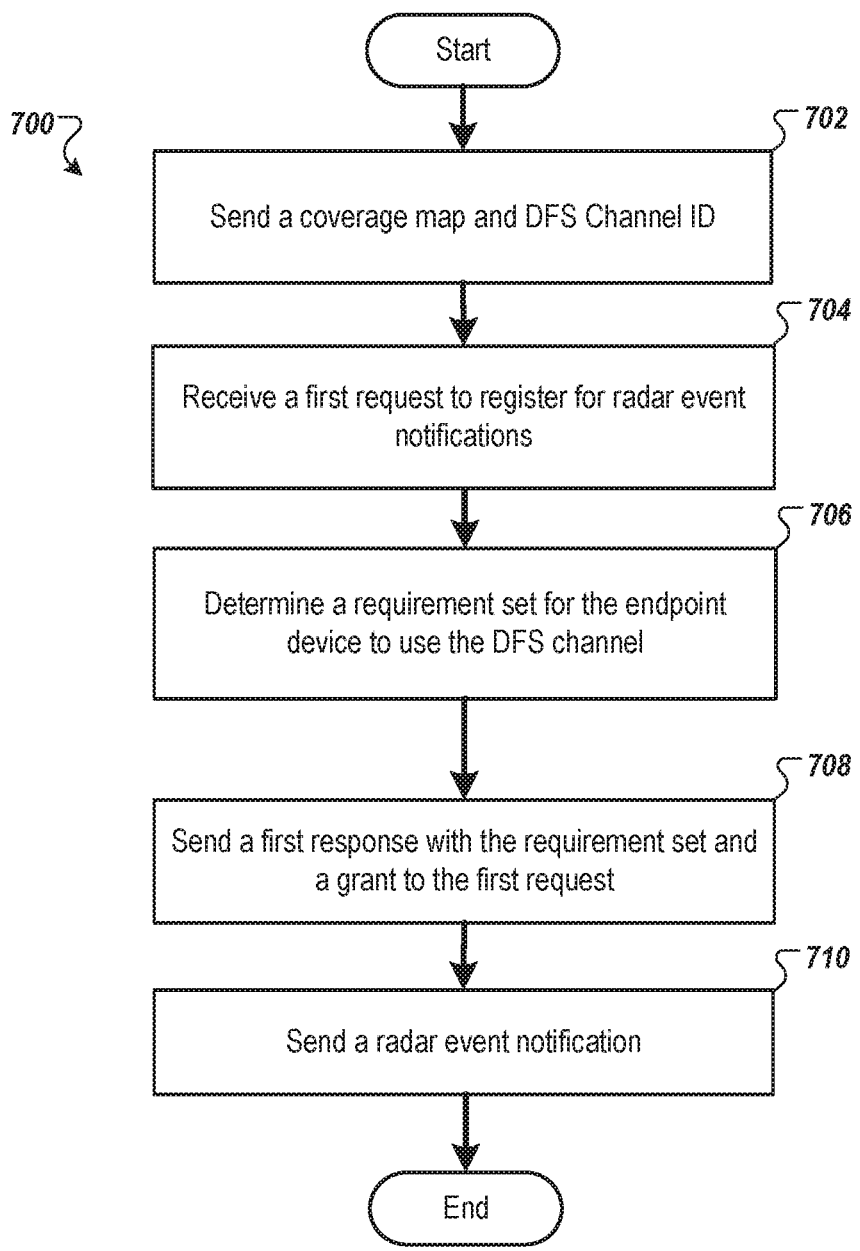
FIG. 7 is a flow diagram illustrating a method 700 of decentralized DFS service for sending radar event notifications to endpoint devices in proximity according to one embodiment.

FIG. 7 is a flow diagram illustrating a method 700 of decentralized DFS master for sending radar event notifications to endpoint devices in proximity according to one embodiment. The method 700 may be performed by processing logic that comprises hardware (e.g., circuitry, dedicated logic, programmable logic, microcode, etc.), software, firmware, or a combination thereof. In one embodiment, the method 700 may be performed by any of the mesh network devices described herein and illustrated with respect to FIGS. 1-7.

Referring back to FIG. 7, the method 700 begins by the processing logic sending coverage map data and an identifier of a DFS channel to an endpoint device (block 702). The processing logic can be part of a mesh network device that is part of a mesh network and the endpoint device is not part of the mesh network. The coverage map data identifies a decentralized DFS service coverage area for providing radar event notifications by a cluster of mesh network devices that is part of the mesh network. The processing logic receives, from the endpoint device, a first request to register with the cluster for radar events in the decentralized DFS service coverage area (block 704). The first request can include first proximity data for a list of devices found as a result of a scan by the endpoint device. The processing logic determines a requirement set for the endpoint device to use a DFS channel (block 706). The requirement set can indicate that: i) the endpoint device must be located within the coverage map data; and ii) the endpoint device must maintain a minimum signal strength level with at least one mesh network device of the cluster. The processing logic sends a first response to the endpoint device (block 708). The first response includes the requirement set and a grant of the first request to register the endpoint device. If the endpoint device does not meet the requirement set, the processing logic can send a denial of the first request. After the endpoint device is registered, the processing logic sends a radar event notification to the endpoint device in response to a radar event detected by any mesh network device in the cluster (block 710), and the method 700 ends.

In a further embodiment, the processing logic receives, prior to the sending the coverage map data at block 702), a second request from the endpoint device to request use of a decentralized DFS service provided by the cluster.

In another embodiment, the processing logic performs a first scan using a radio of the first mesh network device. The first scan finds a set of neighbor devices in physical proximity to the first mesh network device, including at least a second mesh network device. The processing logic sends a first proximity report to the second mesh network device. The first proximity report can include: i) a first list of the set of neighbor devices found as a result of the first scan and for each neighbor device in the first list; ii) a first proximity value that represents a distance between the first mesh network device and the respective device; and iii) an identifier of a DFS channel used by a radio of the respective device. In another embodiment, the processing logic sends a first message including: i) information about a first set of neighbor devices; and ii) a proximity value that represents a distance between the first mesh network device and each device of the first set of devices; and iii) an identifier of a DFS channel used by a radio of each of the first set of devices. The processing logic receives a second proximity report from a second mesh network device. The second proximity report can include: iv) a second list of devices found as a result of a second scan by the second mesh network device and for each device in the second list; v) a second proximity value that represents a distance between the second mesh network device and the respective device; and vi) an identifier of a DFS channel used by a radio of the respective device. In another embodiment, the processing logic receives a second message including: i) information about a second set of neighbor devices; and ii) a proximity value that represents a distance between the second mesh network device and each device of the second set of devices; and iii) an identifier of a DFS channel used by a radio of each of the second set of devices. The processing logic can determine the coverage map data using the first proximity report and the second proximity report. This can be repeated for all mesh network device found during the scan. The coverage map data sent at block 702 can be determine using all proximity reports found in the scan. The coverage map data can be limited to mesh network devices that are operating on a specific DFS channel, such as illustrated in FIG. 1. In other embodiments, the first proximity report can also include: vii) a signal strength value between the first mesh network device and each neighbor device in the first list; and viii) a angle of arrival of one or more packets received from each neighbor device in the first list. In other embodiments, the first proximity report can include a first coverage map data, such as a local coverage map data corresponding to the first mesh network device. The second proximity report can also further include: vii) a signal strength value between the second mesh network device and each device in the second list; and viii) a angle of arrival of one or more packets received from each device in the second list. In other embodiments, the second proximity report can include a second coverage map data, such as a local coverage map data corresponding to the second mesh network device.

In another embodiment, the processing logic can provide a decentralized DFS service to the endpoint device. The endpoint device can be a peer-to-peer device, a wireless display, a wireless remote control, a game console, a wireless game pad, or the like. In other embodiments, the endpoint device can be an AP or a network device of a wireless network that is not part of the mesh network. That is the wireless network of the AP is a different network than the mesh network used for the decentralized DFS service. As such, an endpoint device can use a DFS channel using the decentralized DFS service without having radar detection capabilities for without being a DFS secondary device to the DFS primary node that is proximity.

In another embodiment, the processing logic performs a proximity report exchange with each mesh network device in the mesh network and determines the coverage map data from results of the proximity report exchange before sending the coverage map data at block 702. In other embodiments, the coverage map data can be dynamically adjusted based on the action frames being exchanged between the mesh network devices. In one embodiment, the processing logic performs the proximity report exchange by sending a first proximity report to a second mesh network device in the mesh network and receiving a second proximity report from the second mesh network device. This can be repeated for each mesh network device found in the scan list. The first proximity report can include a first scan list of signal strength indicators corresponding to each neighbor device found by the first mesh network device, a round trip time corresponding to each neighbor device found by the first mesh network device, an angle of arrival for each neighbor device found by the first mesh network device, a DFS channel used by the first mesh network device, and optionally a first local service coverage map data. The second proximity report can include a second scan list of signal strength indicators corresponding to each neighbor device found by the second mesh network device, a round trip time corresponding to each neighbor device found by the second mesh network device, an angle of arrival for each neighbor device found by the second mesh network device, a DFS channel used by the second mesh network device, and optionally a second local service coverage map data. The first proximity report could also include a first number of signal strength indicators each corresponding to a device detected by the first mesh network device and the second proximity report could also include a second number of signal strength indicators each corresponding to a device detected by the second mesh network device.

In another embodiment, the processing logic determines the coverage map data by adding a second local service coverage map data, received from a second mesh network device as part of the proximity report exchange, to a first local service coverage map data of the first mesh network device. Similarly, the processing logic can remove a local service coverage map data to update the coverage map data when a mesh network device is being removed from the coverage area for whatever reason. For example, the processing logic determines that a first action frame to switch channels is received from the second mesh network device. The processing logic removes a second local service coverage map data, corresponding to the second mesh network device, from the coverage map data to obtain an updated coverage map data. The processing logic sends the updated coverage map data to a third mesh network device of the mesh network and the endpoint device. The processing logic can determine that the endpoint device will no longer be covered by the updated coverage map data and can send to the endpoint device a second action frame to switch channels.

In another embodiment, the processing logic determines that a beacon frame is not received from the second mesh network device within a specified time period. The processing logic removes a second local service coverage map data, corresponding to the second mesh network device, from the coverage map data to obtain an updated coverage map data. The processing logic sends the updated coverage map data to a third mesh network device of the mesh network and the endpoint device. The processing logic can determine that the endpoint device will no longer be covered by the updated coverage map data and can send to the endpoint device, an action frame to switch channels.

In another embodiment, the processing logic detects a radar event and sends a radar event notification to each mesh network device in the cluster of mesh network devices and the endpoint device. The processing logic can disable beacon frames from being sent on the DFS channel as well.

Figure 8:
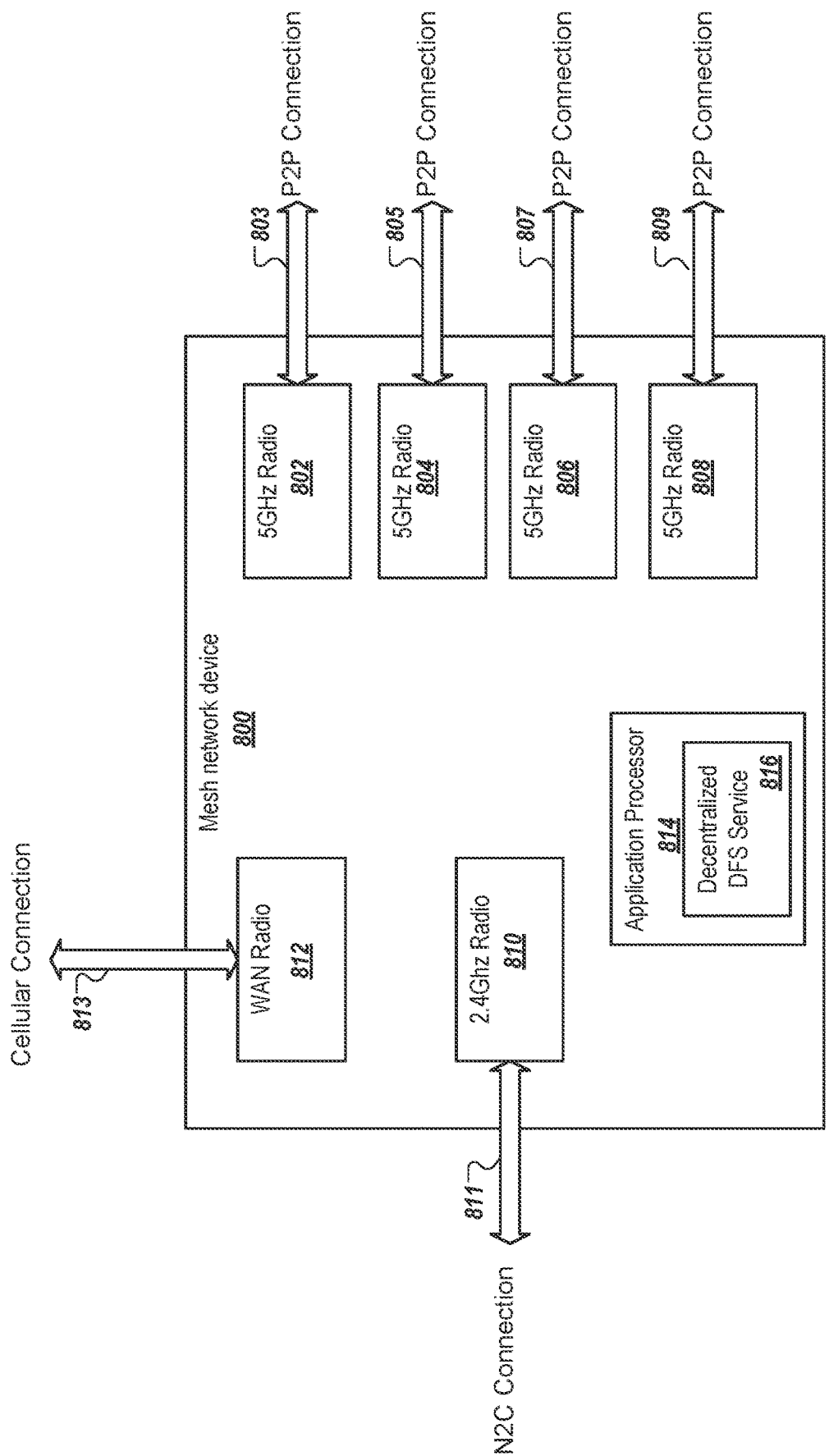
FIG. 8 is a block diagram of a mesh network device with multiple radios according to one embodiment.

FIG. 8 is a block diagram of a mesh network device 800 with multiple radios according to one embodiment. The mesh network device 800 includes a first 5 GHz radio 802, a second 5 GHz radio 804, a third 5 GHz radio 806, a fourth 5 GHz radio 808, a 2.4 GHz radio 810, a cellular radio 812, and an application processor 814. The application processor 814 can be any type of processing device that can implement operations associated with a decentralized DFS service 816, such as described above with respect to FIGS. 1-7. The first 5 GHz radio 802 creates a first P2P wireless connection 803 between the mesh network device 800 and another mesh node (not illustrated) in a WMN. The second 5 GHz radio 804 creates a second P2P wireless connection 805 between the mesh network device 800 and another mesh node (not illustrated) in the WMN. The third 5 GHz radio 806 creates a third P2P wireless connection 807 between the mesh network device 800 and another mesh node (not illustrated) in the WMN. The fourth 5 GHz radio 808 creates a fourth P2P wireless connection 809 between the mesh network device 800 and another mesh node (not illustrated) in the WMN. The 2.4 GHz radio 810 creates a N2C wireless connection 811 between the mesh network device 800 and a client consumption device (not illustrated) in the WMN. The cellular radio 812 creates a cellular connection between the mesh network device 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-point-of-presence (mini-POP) node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to the MNCS by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In a further embodiment, the first node includes a third radio to communicate control data over a cellular connection between the first node and MNCS.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

The DFS service can also provide DFS service to devices that are not in the proximity of any DFS primary node, but are enclosed by a group of primary nodes using a decentralized DFS cloud service as described below with respect to FIG. 9.

Figure 9:
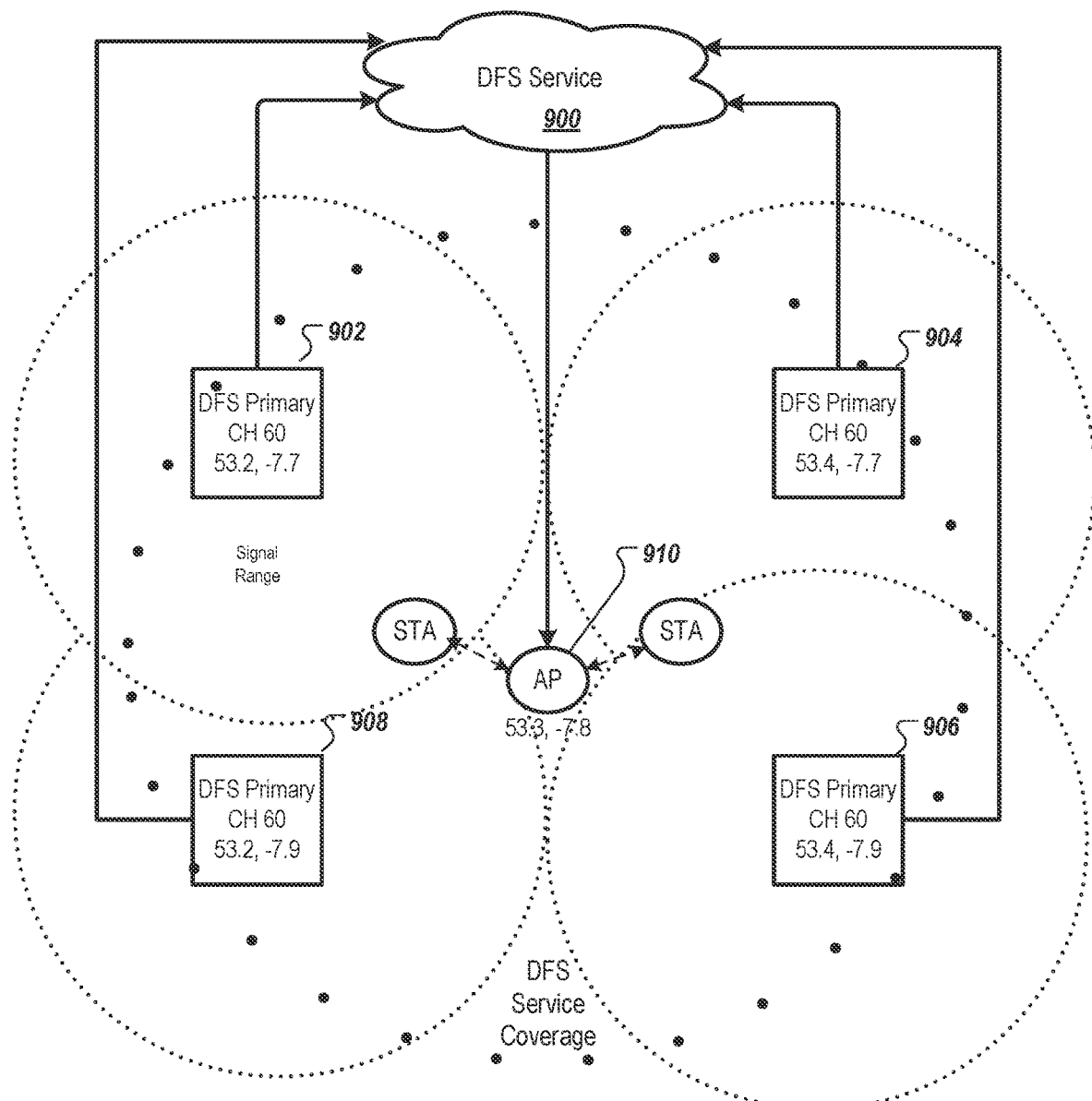
FIG. 9 is a network diagram of a decentralized DFS cloud service for providing radar event notifications to registered devices enclosed by a cluster of mesh network devices according to another embodiment.

FIG. 9 is a network diagram of a decentralized DFS cloud service 900 for providing radar event notifications to registered devices enclosed by a cluster of mesh network devices according to another embodiment. A DFS mesh network can include multiple mesh network devices, such as the four illustrated in FIG. 9, including a first mesh network device 902, a second mesh network device 904, a third mesh network device 906, and a fourth mesh network device 908. These mesh network device can be DFS primary nodes as described herein. The geographical locations (e.g., GPS locations) of the mesh network devices 902, 904, 906, and 908 can be reported to the decentralized DFS cloud service 900. An endpoint device 910, such as an access point (AP), can be located in an area that is partially or fully surrounded by the four mesh network devices 902, 904, 906, 908. The geographical location of the endpoint device 910 can also be reported to the decentralized DFS cloud service 900. The geographical locations of the mesh network devices and the endpoint device 910 can be used to grant DFS service to the endpoint device 910 for radar event notifications.

The endpoint device 910 that is interested in the DFS service can query the decentralized DFS cloud service 900 by sending its GPS location to the decentralized DFS cloud service 900, such as over a websocket connection. If the endpoint device's GPS location is within the DFS coverage provided by mesh network devices (i.e., DFS primary nodes), the decentralized DFS cloud service 900, grants the request with a GPS location requirement map data. The GPS location requirement map data can be defined as an area of longitudinal and latitude coordinates that the endpoint device 910 is allowed to operate within while using the DFS channel. Alternatively, other requirement sets can be defined for the endpoint device 910 to use the DFS channel. The endpoint device 910 can continue to operate on DFS channel as long as 1) the endpoint device 910 does not move out of the GPS location requirement map data and 2) the endpoint device 910 does not receive a CSA signal from the decentralized DFS cloud service 900, and 3) the endpoint device 910 receives a DFS keep-alive packet from the decentralized DFS cloud service 900 every period, such as every 200 ms.

Embodiments of the decentralized DFS service described herein can significantly reduce the cost of endpoint devices whose applications require low latency, low packet error rate, and high performance transport. Instead of incurring the hardware cost of embedding a DFS radar detector and undergo lengthy DFS certification, these endpoint devices can utilize the surrounding DFS cluster for DFS radar detection. Pushing this protocol towards standards would allow any device in proximity to benefit from the clean channels that the DFS cluster provides.

Figure 10:
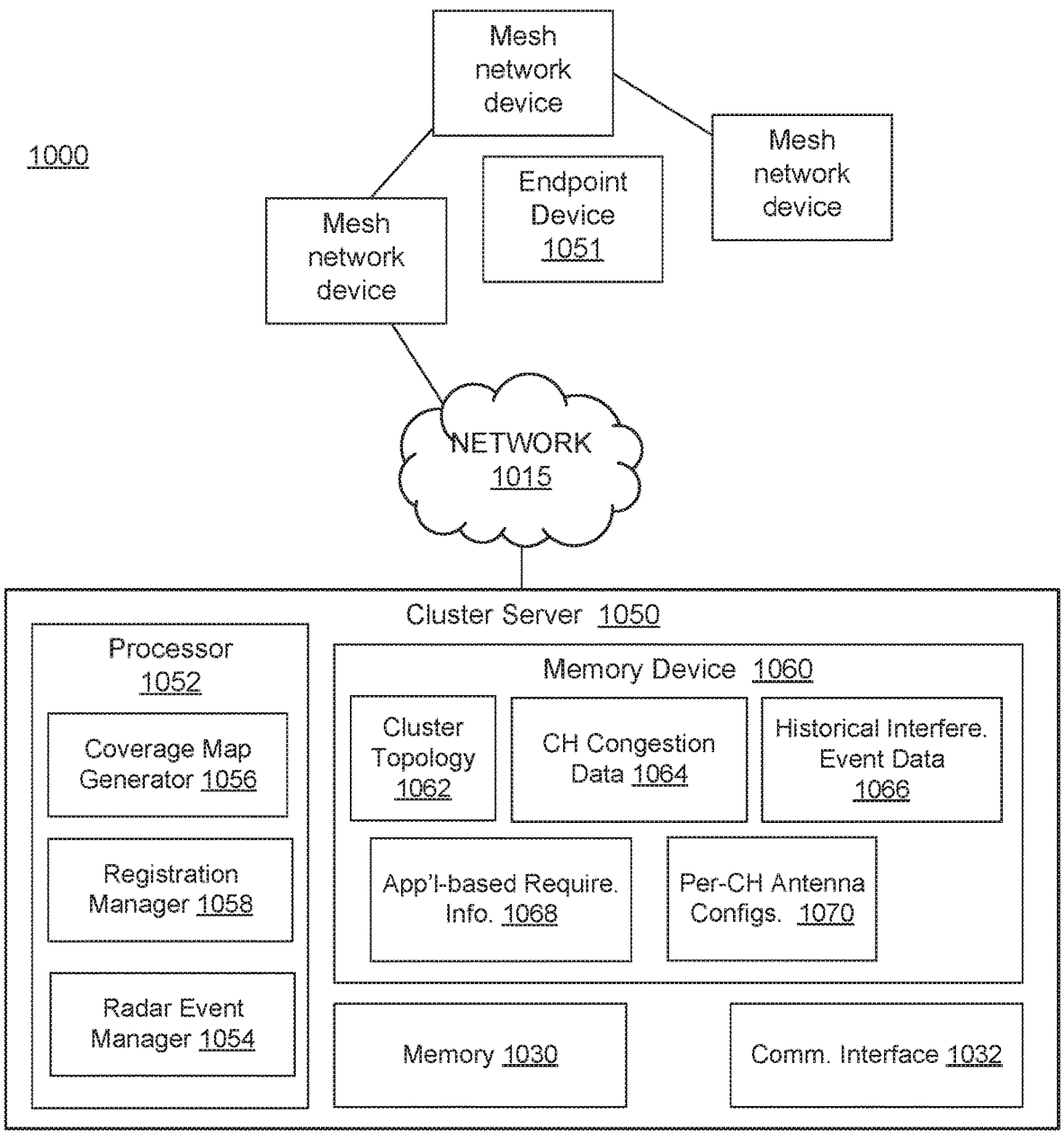
FIG. 10 is a block diagram of a cluster server for a decentralized DFS service for a DFS mesh network and endpoint devices in proximity to the DFS mesh network according to one embodiment.

FIG. 10 is a block diagram of a cluster server 1050 for decentralized DFS service for a DFS mesh network 1000 and endpoint device(s) 1051 in proximity to the DFS mesh network 1000 according to one embodiment. The cluster server 1050 can be a remote server, a cloud computing device such as a cloud server, or a cloud service implemented by one or more servers. The mesh network devices of the DFS mesh network 1000 can communicate with the cluster server 1050 via a network 1015. In various embodiments, the cluster server 1050 may include memory 1030, a communication interface 1032, a processor 1052, and a memory device 1060. The communication interface 1032, which may include one or more network devices for connecting to the Internet, may be adapted to also wirelessly couple the cluster server 1050 to the mesh network devices and to communicate data with the mesh network devices as described herein. The data received from the mesh network devices may include, for example, cluster topology information, such as node location, historical interference event data (e.g., which mesh network devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple mesh network devices communicate. The received data may further include information associated with, or useable to determine, pattern recognition and learning associated with radar event detection, data bandwidth requirements, and latency requirements, and the like. The received data may also include scan lists, proximity data, DFS channels, requirement sets, or the like as described above with respect to FIG. 1-9.

In embodiments, the memory device 1060 includes data stored, which are related to channels of the mesh network devices and associated with cluster topology information 1062 of the WMN, channel congestion data 1064, historical interference event data 1066, historical application-based requirements information 1068 (e.g., historical application-based throughput and latency requirements), and per-channel antenna configurations 1070. The memory device can also store data to be used for the decentralized DFS service, including the DFS channels, as well as fallback channels of the DFS channels. The network 1015 may be representative of an Internet or WAN connection. Such an Internet or WAN connection may include additional links or trunks, whether wired or wireless, that may involve other types of wideband communication, including those based on cellular standard(s).

In various embodiments, the processor 1052 (e.g., processing device) includes coverage map data manager 1056, a registration manager 1058, and a radar event manager 1054. The coverage map data manager 1056 can collect information from the devices for purposes of generating and maintain coverage map data for the decentralized DFS service. The registration manager 1058 can handle registration requests by endpoint device(s) 1051 that are interested in radar event notifications so that the endpoint device(s) 1051 can use the DFS channels. These endpoint device(s) 1051 may not part of the DFS mesh network 1000, but are in proximity to mesh network device of the DFS mesh network 1000. The endpoint device(s) 1051 may not have radar detection capability, but by registering with the registration manager 1058, the endpoint device(s) 1051 can receive radar event notifications. The radar event manager 1054 can receive notifications regarding radar events from the devices. The radar event manager 1054 can assist in the endpoint device(s) 1051 receiving the radar event notifications when registered with the registration manager 1058. It should be noted that the endpoint device(s) 1051 can receive the radar event notifications from one of the mesh network device or from the radar event manager 1054.

Figure 11:
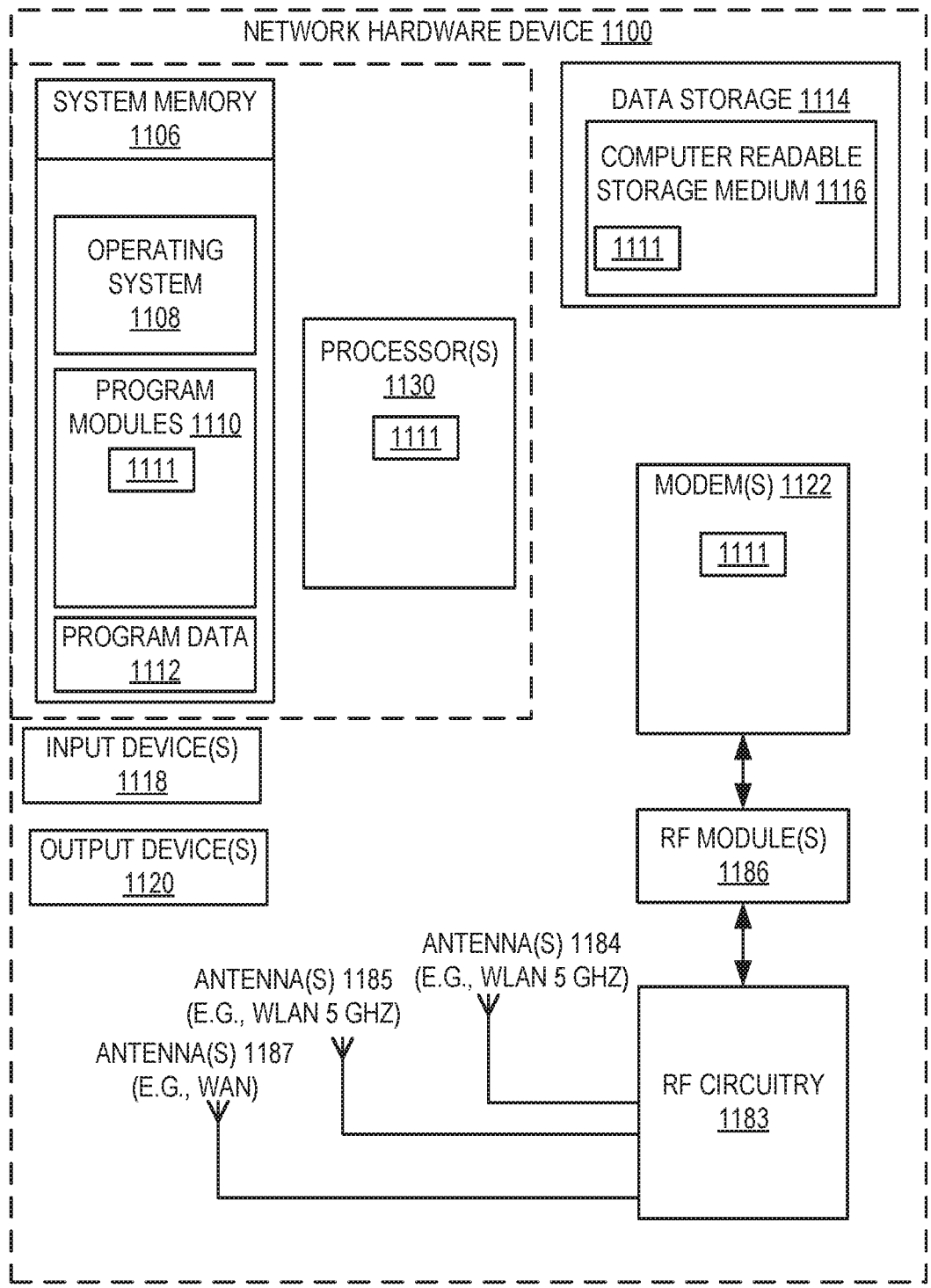
FIG. 11 is a block diagram of a network hardware device for providing a decentralized DFS service according to one embodiment.

FIG. 11 is a block diagram of a network hardware device 1100 for providing a decentralized DFS service according to one embodiment. The network hardware device 1100 may correspond to the mesh network devices described above with respect to FIGS. 1-10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control operation of the network hardware device 1100. The network hardware device 1100 performs functions by using the processor(s) 1130 to execute instructions provided by the system memory 1106. In one embodiment, the program modules 1110 may include a decentralized DFS service manager 1111. The decentralized DFS service manager 1111 may perform some of the operations of the decentralized DFS service processes descried herein.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 (e.g., decentralized DFS service manager 1111) may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more radio frequency (RF) modules 1186. The RF modules 1186 may be a WLAN module, a WAN module, PAN module, GPS module, or the like. The antenna structures (antenna(s) 1184, 1185, 1187) are coupled to the RF circuitry 1183, which is coupled to the modem 1122. The RF circuitry 1183 may include radio front-end circuitry, antenna switching circuitry, impedance matching circuitry, or the like. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a first mesh network device that is part of a mesh network and from a first device that is not part of the mesh network, a request to receive information about a plurality of radar events without joining the mesh network, wherein data related to a radar event, from the plurality of radar events, is receivable in an area and wherein the data related to the radar event is sent by one or more mesh network devices that are part of the mesh network, wherein the request comprises an identifier of a Dynamic Frequency (DFS) channel and first proximity data that indicates a physical distance between the first device and a second mesh network device, of the one or more mesh network devices, that is in the vicinity of the first device;
   determining, by the first mesh network device, that i) the first device is located within the area; and ii) the first device is communicatively coupled with the second mesh network device;
   sending, by the first mesh network device to the first device, a response to the request, the response comprising iii) authorization to receive the information about the plurality of radar events and iv) coverage map data that identifies the area; and
   sending, by the first mesh network device to the first device, first data related to a first radar event, wherein the first radar event is detected by a mesh network device of the one or more mesh network devices.

2. The method of claim 1, further comprising:
   sending, by the first mesh network device to the second mesh network device, a first message including: i) information about a first set of devices; ii) a proximity value that represents a physical distance between the first mesh network device and each device of the first set of devices; and iii) an identifier of a DFS channel used by a radio of each of the first set of devices;
   receiving, by the first mesh network device from the second mesh network device, a second message including iv) information about a second set of devices; v) a proximity value that represents a physical distance between the second mesh network device and each device of the second set of devices; and vi) an identifier of a DFS channel used by a radio of each device of the second set of devices; and
   determining, by the first mesh network device, the coverage map data using data from the first message and the second message.

3. The method of claim 2, wherein the first message further comprises:
   vii) a signal strength value between the first mesh network device and each device in the first set of devices; and
   viii) an angle of arrival of a packet received from each device in the first set,
   wherein the second message further comprises:
   ix) a signal strength value between the second mesh network device and each device in the second set; and
   x) an angle of arrival of a packet received from each device in the second set.

4. The method of claim 1, further comprising providing, by the first mesh network device, a DFS service to the first device, wherein the first device does not have radar detection capability.

5. The method of claim 1, further comprising providing, by the first mesh network device, a DFS service to the first device, wherein the first device is an access point (AP) that is not part of the mesh network.

6. The method of claim 1, further comprising:
   performing, by the first mesh network device, a proximity report exchange with each mesh network device in the mesh network; and determining, by the first mesh network device, the coverage map data from results of the proximity report exchange.

7. The method of claim 6, wherein performing the proximity report exchange comprises:
sending a first proximity report to a second mesh network device in the mesh network; and
receiving a second proximity report from the second mesh network device,
wherein the first proximity report comprises a first number of signal strength indicators each corresponding to a device detected by the first mesh network device, a round trip time corresponding to each device found by the first mesh network device, an angle of arrival of packets from each device found by the first mesh network device, a DFS channel used by the first mesh network device, and first local service coverage map data, and
wherein the second proximity report comprises a second number of signal strength indicators each corresponding to a device detected by the second mesh network device, a round trip time corresponding to each device found by the second mesh network device, an angle of arrival of packets from each device found by the second mesh network device, a DFS channel used by the second mesh network device, and second local service coverage map data.

8. The method of claim 6, wherein determining the coverage map data comprises combining, by the first mesh network device, second local service coverage map data, received from a second mesh network device as part of the proximity report exchange, with first local service coverage map data of the first mesh network device, wherein the first local service coverage map data identifies a first area within a signal range of the first mesh network device and the second local service coverage map data identifies a second area within a signal range of the second mesh network device.

9. The method of claim 1, further comprising:
determining, by the first mesh network device, that a first action frame to switch from a DFS channel to a non-DFS channel is received from the second mesh network device in response to the second mesh network device detecting a radar event in a section of the area;
removing, by the first mesh network device, data from the coverage map data to obtain updated coverage map data, wherein the data removed from the coverage map data corresponds to the section of the area; and
sending, by the first mesh network device, the updated coverage map data to a third mesh network device of the mesh network and the first device.

10. The method of claim 9, further comprising:
determining, by the first mesh network device, that the first device is located in the section of the area; and
sending, by the first mesh network device to the first device, a second action frame to switch from the DFS channel to the non-DFS channel.

11. The method of claim 1, further comprising:
determining, by the first mesh network device, that a frame is not received from the second mesh network device within a specified time period;
removing, by the first mesh network device, data from the coverage map data to obtain updated coverage map data, wherein the data removed from the coverage map data corresponds to a section of the area; and sending, by the first mesh network device, the updated coverage map data to a third mesh network device of the mesh network and the first device.

12. The method of claim 11, further comprising:
determining, by the first mesh network device, that the first device is located in the section of the area; and
sending, by the first mesh network device to the first device, an action frame to switch from a DFS channel to a non-DFS channel.

13. The method of claim 1, further comprising:
detecting, by the first mesh network device, the first radar event; and
sending, by the first mesh network device, the first data about the first radar event to each mesh network device of the one or more mesh network devices; and
sending, by the first mesh network device to the first device, an action frame to switch from a DFS channel to a non-DFS channel.

14. A mesh network device that is part of a mesh network, the mesh network device comprising:
a radio;
an application processor coupled to the radio, wherein the application processor is to:
receive, from a first device, a request to receive information about a plurality of radar events, wherein data related to a radar event, from the plurality of radar events, is receivable in an area and wherein the data related to the radar event is sent by one or more mesh network devices that are part of the mesh network, wherein the request comprises an identifier of a Dynamic Frequency (DFS) channel and first proximity data that indicates a physical distance between the first device and a second mesh network device, of the one or more mesh network devices, that is in the vicinity of the first device;
determine that i) the first device is located within the area; and ii) the first device is communicatively coupled with the second mesh network device;
send, to the first device, a response to the request, the response comprising iii) authorization to receive information about the plurality of radar events and iv) coverage map data that identifies the area; and
send, to the first device, first data related to a first radar event, wherein the first radar event is detected by a mesh network device of the one or more mesh network devices.

15. The mesh network device of claim 14, wherein the application processor is further to:
detect the first radar event;
send the first data about the first radar event to each mesh network device of the one or more mesh network devices; and
send, to the first device, an action frame to switch from the DFS channel to a non-DFS channel.

16. The mesh network device of claim 14, wherein the application processor is further to:
send, to the second mesh network device, a first message including: i) information about a first set of devices; ii) a proximity value that represents a physical distance between the mesh network device and each device of the first set of devices; and iii) an identifier of a DFS channel used by a radio of the each of the first set of devices;
receive, from the second mesh network device, a second message including: iv) information about a second set of devices; v) a proximity value that represents a physical distance between the second mesh network device and each device of the second set of devices; and vi) an identifier of a DFS channel used by a radio of each device of the second set of devices; and determine the coverage map data using data from the first message and the second message.

17. The mesh network device of claim 14, wherein the application processor is further to:

determine that a frame is not received from the second mesh network device within a specified time period or that a first action frame to switch from the DFS channel to a non-DFS channel is received from the second mesh network device in response to the second mesh network device detecting a radar event in a section of the area;

remove data from the coverage map data to obtain an updated coverage map data, wherein the data removed from the coverage map data corresponds to the section of the area;

send the updated coverage map data to a third mesh network device of the mesh network and the first device;

determine that the first device is located in the section of the area; and send, to the first device, a second action frame to switch from the DFS channel to the non-DFS channel.

18. A dynamic frequency selection (DFS) mesh network comprising:

a first mesh network device with radar detection capability; and a second mesh network device with radar detection capability, wherein the first mesh network device is to:

perform a proximity report exchange with the second mesh network device; and determine coverage map data from results of the proximity report exchange, wherein the coverage map data identifies an area in which data related to a radar event is receivable and wherein the data related to the radar event is sent by the first mesh network device or the second mesh network device;

receive, from a first device that is not part of the DFS mesh network, a request to receive information about a plurality of radar events, wherein the request comprises an identifier of a Dynamic Frequency (DFS) channel and proximity data that indicates a physical distance between the first device and the first mesh network device and a physical distance between the first device and the second mesh network device;

determine that i) the first device is located within the area; and ii) the first device is communicatively coupled with the first mesh network device or the second mesh network device;

send, to the first device, a response to the request, the response comprising iii) authorization to receive the information about the plurality of radar events and the coverage map data that identifies the area; and send, to the first device, first data about a first radar event, wherein the first radar event is detected by the first mesh network device or the second mesh network device, wherein the first device receives the first data about the first radar event without performing its own radar detection or channel availability check (CAC).

19. The DFS mesh network of claim 18, wherein the first mesh network device is further to:

determine that a first action frame to switch from the DFS channel to a non-DFS channel is received from the second mesh network device in response to the second mesh network device detecting a radar event in a section of the area;

remove data from the coverage map data to obtain updated coverage map data, wherein the data removed from the coverage map data corresponds to the section of the area;

determine that the first device is located in the section of the area; and send, to the first device, a second action frame to switch from the DFS channel to the non-DFS channel.

20. The DFS mesh network of claim 18, wherein the first mesh network device is further to:

determine that a frame is not received from the second mesh network device within a specified time period;

remove data from the coverage map data to obtain updated coverage map data, wherein the data removed from the coverage map data corresponds to a section of the area;

determine that the first device is located in the section of the area that is no longer part of the updated coverage map data; and send, to the first device, an action frame to switch from the DFS channel to a non-DFS channel.

* * * * *